United States Patent [19]

McComas et al.

[11] 3,798,650

[45] Mar. 19, 1974

[54] MEANS FOR SYNCHRONIZING CLOCKS IN A TIME ORDERED COMMUNICATIONS SYSTEM

[75] Inventors: Arthur D. McComas; James R. Ransom; James A. Kessler; Charles H. Doeller, III; Aaron Mall, all of Baltimore, Md.

[73] Assignee: The Bendix Corporation, Southfield, Mich.

[22] Filed: Oct. 2, 1972

[21] Appl. No.: 294,055

[52] U.S. Cl. .......................... 343/225, 340/147 SY

[51] Int. Cl. .......................... H04b 7/00

[58] Field of Search .......................... 343/225; 340/147 SY

[56] References Cited

UNITED STATES PATENTS

| | | | |
|---|---|---|---|
| 2,980,858 | 4/1961 | Grondin et al. | 340/147 SY |
| 3,109,897 | 11/1963 | Carbrey | 340/147 SY |
| 3,128,465 | 4/1964 | Brilliant | 343/225 |

*Primary Examiner*—John W. Caldwell
*Assistant Examiner*—Marshall M. Curtis

[57] ABSTRACT

A time ordered communications system wherein a master station equipped with a master clock which includes a reference oscillator disseminates correct time to remote stations equipped with local clocks which include local oscillators by transmitting a synchronization signal whose time of arrival at the remote station with respect to an internal reference pulse generated by the remote station is a measure of remote station clock error. The time interval between receipt of the synchronization signal and generation of the internal reference pulse is digitally determined to produce an error signal which is used to add or delete local oscillator pulses so as to immediately phase correct the local clock. In addition, the first and second time derivatives of the error signal are obtained and used to compensate the local clock for oscillator drift and other errors.

3 Claims, 4 Drawing Figures

MEANS FOR SYNCHRONIZING CLOCKS IN A TIME ORDERED COMMUNICATIONS SYSTEM

BACKGROUND OF THE INVENTION

This invention relates to remote clocks in a time ordered system and more particularly to means for reducing the errors of remote clocks by repeated comparison with a standard clock.

There is a need for time ordered communications systems wherein each of a plurality of remote cooperating stations maintains accurate time. These cooperating stations suitably comprise operating aircraft communicating with each other and with ground stations. In this type of system each remote station maintains an accurate local clock to provide his accurate time. If the local clocks are operated from extremely accurate frequency sources, such as cesium beam standards, continual synchronization of the various clocks with one another within the communication system is all that is required to maintain a valid time ordered system. However, the cost of a frequency standard is related to its accuracy and stability. For example, an atomic frequency standard such as the cesium beam standard is extremely expensive while a crystal controlled frequency source is much more economical in cost and weight. However, crystal controlled sources are greatly dependent upon frequent resynchronization to maintain their valid position in a time ordered communications system and additionally will require frequent calibration.

In a typical time ordered communications system the various remote clocks are maintained synchronous with one another usually through synchronization of the various remote clocks individually with a master station, such as a ground station, which disseminates absolute time. The dissemination of absolute time can be accomplished in various ways. For example, two-way time synchronization can be used in certain time ordered systems wherein a remote station requests synchronization and the master station in response thereto provides a synchronization response. This first method of time dissemination is particularly adapted for use in time ordered communication systems wherein the distance separating the master station from the remote station is not known. As another example, where the distance separating the master station from the remote station is known at the master station, one-way time synchronization can be used since the transit time between stations is known at the master station. In any event, the master station transmits a synchronization signal at such a time that the arrival of the synchronization signal at the remote station with respect to a remote station internally determined time is a measure of the time deviation of the remote clock with respect to the master clock. The remote station will thus be able to exactly synchronize his clock with the master clock if it so desires.

In the copending patent application Ser. No. 144,947 entitled "Self-Adjusting Frequency Source" assigned to the same assignee as this application, there was described means for maintaining a remote clock synchronized with a master clock. In that patent application both time and frequency were to be synchronized to a master station time and frequency, hence a local oscillator frequency for driving the remote clock was generated from a phase locked loop and corrections derived from synchronization of the clock with respect to the master clock were applied to the phase locked loop to alter the frequency output signal thereof.

SUMMARY OF THE INVENTION

It is now desired to provide a means of maintaining a remote clock time synchronized with a master clock through the use of digital elements. This is accomplished by providing a local oscillator whose output frequency approximates desired local frequency for driving the local clock to be maintained synchronized with the master clock. Correction to the local oscillator output frequency is provided by adding or subtracting pulses in its output signal to produce the proper local frequency. The synchronization signal transmitted by the master station is processed in the remote station to produce a single pulse, herein termed the external reference pulse or preferably ERP. An internal reference pulse or preferably IRP is generated by the remote station at the proper time. The time of occurrence of the ERP with respect to the IRP is determined by accumulating relatively high frequency clock pulses in a counter during the time interval between the occurrence of the IRP and the ERP. The number of clock pulses so accumulated is now scaled to produce a digital number which is used to add or subtract clock pulses from the local oscillator output signal. Pulses are added if it is determined that the remote clock is behind the master clock and pulses are subtracted if it is determined that the remote clock is ahead of the master clock. This correction is performed once each time an ERP is received. At the completion of the correction the remote clock is essentially synchronized to the master clock. However, the local clock will immediately begin to drift out of synchronization. Accordingly, further correction is required to maintain the remote clock essentially synchronized with the master clock between these calibration periods. This is accomplished essentially by determining the first and second time derivatives of the time difference between the ERP and the IRP and applying these as further corrections to add or delete pulses from the local oscillator output signal on a continuing basis.

It is thus an object of this invention to provide an inexpensive clock which is suitable for use in a time ordered communication system.

It is another object of this invention to provide means for maintaining a clock operating in a time ordered communication system in essentially continuous calibration.

It is another object of this invention to provide means of the type described which operate on digital principles.

DESCRIPTION OF THE PREFERRED EMBODIMENT

Figure 1:
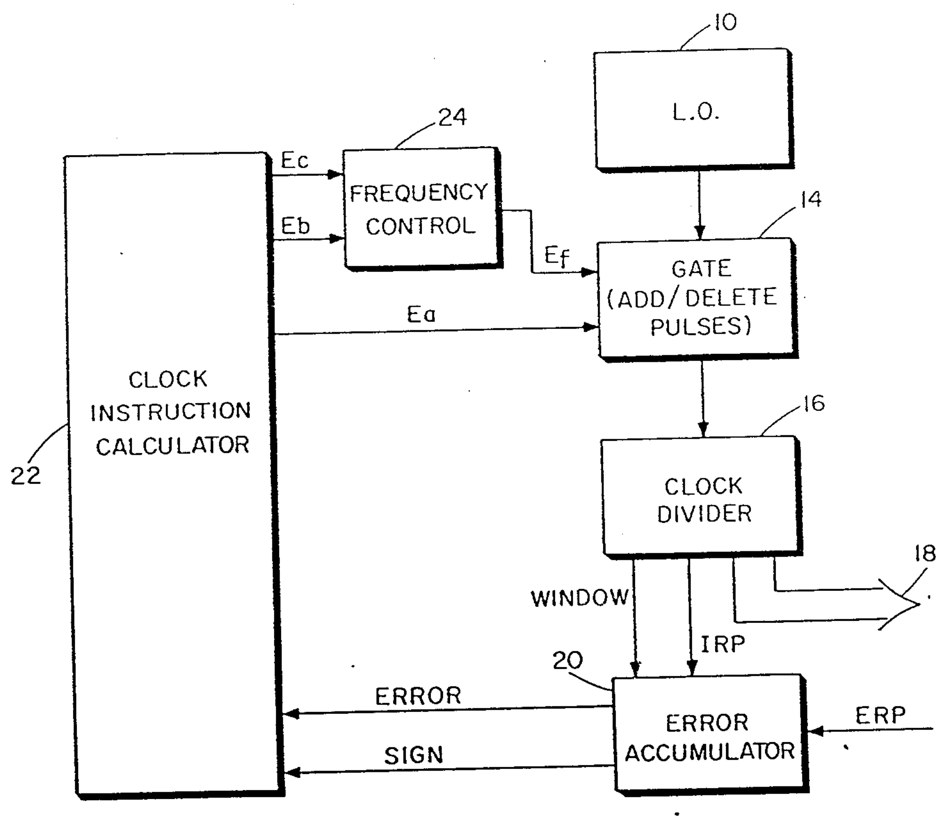
FIG. 1 is a block diagram of the invention.

Refer to the figures wherein like reference numerals refer to like items and referring more particularly to FIG. 1, there is seen a block diagram of a local station having a local oscillator 10 which drives a clock divider 16 which is to be maintained synchronous with a master clock. Local oscillator 10 is suitably a fixed quartz crystal oscillator which generates a square wave comprised of an accurately timed series of pulses at a high pulse repetition frequency. This signal is passed through a gate 14 to the clock divider 16 which divides the high, regular rate of the oscillator output pulses to a plurality of lower rate signals represented by 18 and which are required by the associated equipment. The type of signals 18 required by the associated equipment are well known to those skilled in the art and need not be described at this time. Local oscillator 10, gate 14 and a clock divider 16 comprise a crystal clock of the type which is well known in this art for use in a time ordered communication system.

Clock divider 16 produces two additional signals which are needed to maintain the clock synchronized with the master clock: an internal reference pulse (IRP) and a window. An external reference pulse (ERP) is derived by means not shown at the local station from a signal transmitted by the master station. The window together with the IRP of the clock divider 16 are applied to error accumulator 20, together with the ERP. The window is arranged symmetricallly about the IRP. If the ERP is received in the window the time difference between the IRP and the ERP are determined by the error accumulator. The error accumulator generates an error signal having magnitude and sign, the sign indicating which of the IRP or the ERP occurred first. The error signal is applied to a clock instruction calculator 22 which calculates therefrom a correction signal $E_a$ which is applied directly to gate 14 to add or delete pulses from the local oscillator output signal to thereby bring clock divider 16 into synchronization with the master station. It should be noted that correction signal $E_a$ is a measurement of the instantaneous misalignment of clock divider 16 with respect to the master clock. Calculator 22 also calculates from the error signal generated by error accumulator 20 further signals $E_b$ and $E_c$ which respectively are related to the first time derivative and second time derivative of the error signal. These latter signals are measures of the stability and any frequency offset of the local oscillator 10 and are applied to frequency control 24 to produce a further correction signal $E_f$ which is applied to the gate 14 to compensate for the drift and offset in local oscillator 10.

An IRP will be generated at regular intervals, for example, once a second. The interval between IRP's is termed a clock interval with the IRP being generated at the beginning of each clock interval. On the other hand, an ERP is not available at the beginning of each clock interval and in fact occurs much less often and probably will not be available at regular intervals. If an ERP is available during a given window then a successful time correction can be made. Of course, if no ERP is available during the time window then the attempted time correction is unsuccessful.

It should be noted that error signal $E_a$ is applied only once to gate 14 to add or subtract the required number of pulses from the local oscillator output signal each time an ERP is available. On the other hand, error signal $E_f$ is applied relatively continuously to gate 14 and operates to delete or add a single pulse at widely separated intervals in the pulse train output of oscillator 10.

Figure 2:
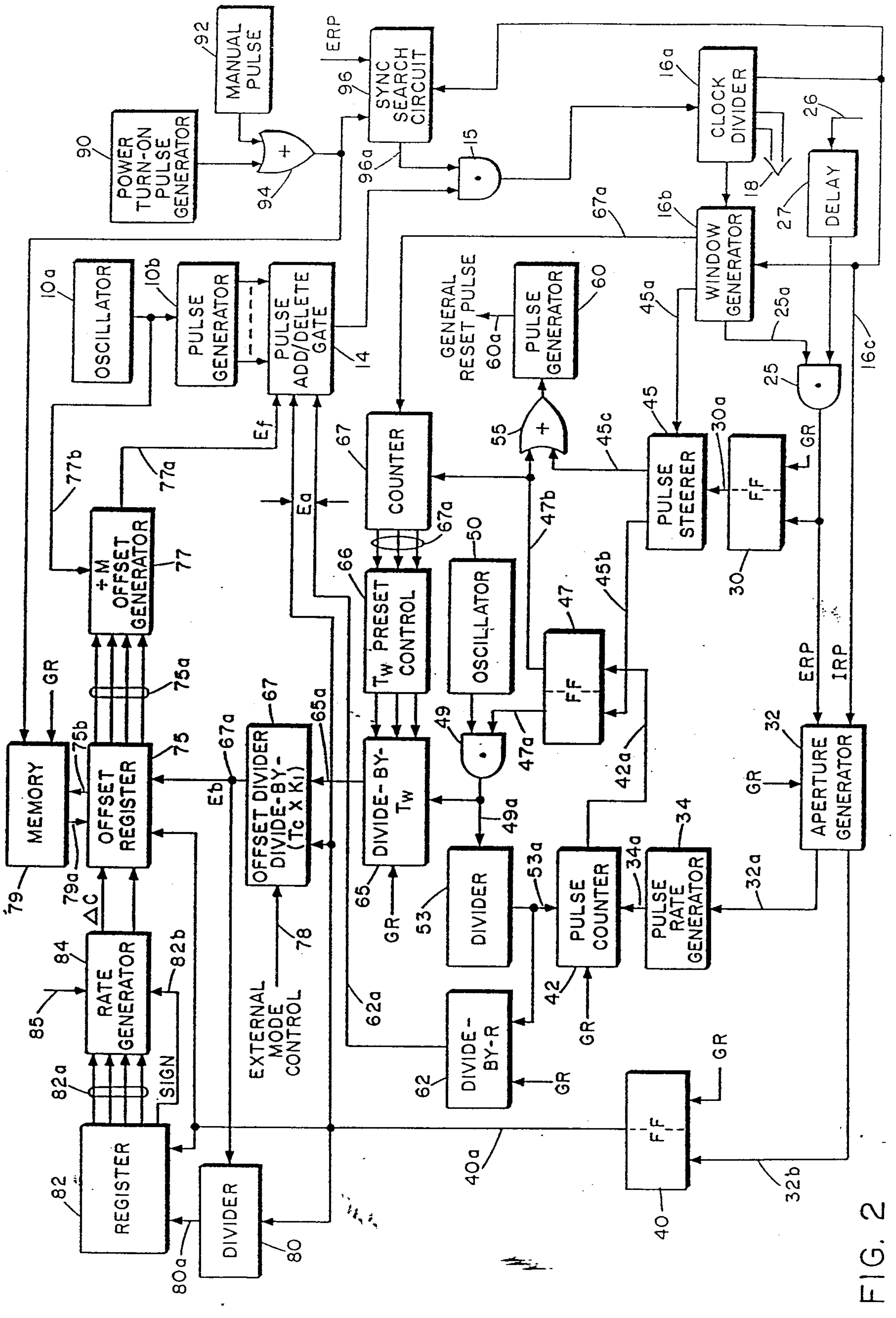
FIG. 2 is a block diagram which shows the invention in greater detail.

Refer now to FIG. 2 which shows the embodiment of the invention of FIG. 1 in greater detail. In this figure the local oscillator is seen to be comprised of an oscillator 10*a* and a pulse generator 10*b* which, in response to each pulse output from oscillator 10*a*, produces a multiple phase clock pulse train, where each phase is on a separate wire. The pulses of each phase occur at the same pulse rate as the pulse train output from oscillator 10*a*, but the phases are distributed evenly over the interval between two adjacent pulses from oscillator 10*a*. Multiple phase clock pulses of this type can be produced quite simply by a delay circuit, suitably a pulse delay circuit or a lumped constant delay circuit.

The function of gate 14 has previously been described and the details of its operation will be described below. The pulse train from gate 14 passes through the normally open gate 15 into clock divider 16 comprised of the divider 16*a* and window generator 16*b*. Gate 15 is used during initial start of the system and its operation will be explained below. Divider 16*a* is basically a digital divider which generates timing signals 18 for use by the local equipment. Divider 16*a* is of that type known to those skilled in the art suitable for use in a time ordered communication system. Divider 16*a* also generates an internal reference pulse on line 16*c* at a regular rate, for example, every nth pulse applied to the divider. The IRP is generated at the instant an ERP would be available if the local clock were synchronized exactly to the master clock. In actuality, the IRP is delayed slightly to compensate for decoding and other system delays to the ERP. These delays to the ERP can quite easily be determined, hence the IRP is able to be generated at the instant the ERP is available as a correction pulse. Further mention of these delays is not necessary for an understanding of this invention and the IRP should be thought of as being synchronized with the output signal of divider 16*a*. In other words, in assuming that the master station calibrates all remote clocks in the same manner, the IRP generated by each of those remote clocks are occurring simultaneously.

The window generator 16*b* responds to signals from divider 16*a* to generate a window symmetrically about the IRP. This window is represented by a relatively high signal on line 25*a* which is applied to qualify AND gate 25.

The ERP derived from the master station transmission is applied through a delay 27, which represents the aforementioned decoding and other propagation delays of the system, as the second input to gate 25. Thus, if the ERP is received during the period of the window on line 25*a* it passes through gate 25 and is applied to set flip-flop 30 which thereupon generates an output on line 30*a*. In addition, the ERP after passing through gate 25 is applied together with the IRP to an aperture generator 32. Aperture generator 32 operates to generate an aperture pulse which is started by one signal, ERP or IRP, whichever is first, and stopped by the other. The resulting aperture pulse appears on line 32*a* which gates on a triggered pulse rate generator 34 which thereupon produces a high speed series of pulses on line 34*a* so long as the aperture pulse is applied thereto. In a unit actually built the pulses on line 34*a* occurred at 50 nanosecond intervals. It is additionally important for proper calibration of the clock that the occurrence of the first pulse from generator 34 be invariant but not necessarily equal to the period of the remaining pulses. The design of pulse rate generators of the type here described is well known to those skilled in the art.

Aperture generator 32 also produces an output on line 32*b* if the IRP occurs before the ERP and produces no output if the ERP occurs before the IRP. The signal on line 32*b* is applied to set flip-flop 40 so that it generates an output on line 40*a*. It should be understood that flip-flop 40 was previously in a reset state as will be explained below. It should now be obvious that the signal on line 40*a* indicates the sign of the several clock correction operations to be described, that is, indicates whether pulses are to be added to or deleted from the pulse train by gate 14.

Since pulses appear on line 34*a* during the period of the aperture on line 32*a* which corresponds to the time difference between the occurrence of the ERP and IRP, the number of pulses on line 34*a* is a measure of that time difference in units of the pulse period of those pulses, which in a model actually built was 50 nanoseconds. The pulses on line 34*a* are accumulated by counting up counter 42 wherein they are stored for subsequent use.

As previously mentioned an IRP is generated at the beginning of each clock interval. However, it is the nature of the expected master station transmissions that an ERP will be available at this station at only a relatively small percentage of clock intervals. Thus, a relatively large percentage of windows on line 25*a* will not find an ERP present. It is the function of flip-flop 3o to indicate after each window whether an ERP was actually available. This is accomplished as follows. Generator 16*b* generates a pulse on line 45*a*, this pulse being applied to a Go No-Go pulse generator 45. Pulse generator 45 is in the nature of a steering network which steers the pulse on line 45*a* onto line 45*b* if there is a signal present on line 30*a* and steers the pulse from line 45*a* to line 45*c* if there is no signal present on line 30*a*. Of course, as will be remembered, there is a signal on line 30*a* if an ERP has been generated. Assuming first that the pulse is steered to line 45*b*, this pulse is used to set flip-flop 47 which in response thereto generates an output on line 47*a*. The signal on line 47*a* qualifies AND gate 49 which thereupon allows pulses from high speed count-down oscillator 50 to pass therethrough and into divider 53. The divided down pulses are applied via line 53*a* to counter 42 to count down that counter to zero. When that counter reaches the zero state it generates an output on line 42*a* which resets flip-flop 47, thus extinguishing the signal at line 47*a* and closing gate 49. Accordingly, the pulses from oscillator 50 can no longer pass therethrough. In essence, the contents of counter 42 have been multiplied by the divisor of divider 53, with the results of this multiplication appearing on line 49*a*. This process of multiplication is done to reduce some digital quanticizing effects. The exact multiple used is subject to the requirements of the particular application and is a system designer option. In a unit actually built oscillator 50 generated pulses at one nanosecond intervals and the divisor of divider 53 was 50.

When flip-flop 47 is reset by the signal on line 42*a* it generates an output on line 47*b*. This signal passes through OR gate 55 to trigger pulse generator 60 to generate a single pulse which is known herein as general reset pulse or simply GR. This general reset pulse appears on line 60*a*. It will be noticed that the general reset pulse is used to return a number of elements to their initial state. This includes, of the elements already described, counter 42, aperture generator 32, flip-flops 40 and 30.

It is expected that in the environment in which the system of FIG. 2 will be used an IRP window will be generated every second while an ERP will be generated less often. It is the function of flip-flop 30 to indicate after each generation of an IRP whether an ERP was received during the window. In other words, flip-flop 30 provides an indication of whether a successful time correction has been achieved. This is accomplished as follows. When the end of window pulse on line 45a is generated by window generator 16*b* the pulse steerer 45 uses the output signal from flip-flop 30 to steer that pulse as previously mentioned. In the event no ERP is generated during the time of this particular window flip-flop 30 remains reset and the pulse steerer 45 steers the end of window pulse to line 45*c* and through gate 55 to pulse generator 60 so that it thereupon immediately generates the general reset pulse on line 60*a*. Thus, various control elements including counter 42 are reset to an initial state before the pulses contained in counter 42 can be used to correct the local clock.

When an ERP has been received during the window, counter 42 is counted down to zero by the output of divider 53 on line 53*a* as previously described. The pulses on line 53*a* are also applied to a divide-by-R counter 62 with the output of this latter counter being the number of pulses to be added or deleted from the pulse stream issuing from generator 10*b* in gate 14. The required division ratio for divider 62 is: $R=P_o/(P_t \times N)$ where $P_O$ is the period of pulses generated by oscillator 10*a*, $P_t$ is the period of the pulses generated by generator 34, and where N is the number of phases output from pulse generator 10*b*. In a unit actually built where $P_O$ was equal to 200 nanoseconds, $P_t$ was equal to 50 nanoseconds and N was equal to 2, R was equal to 2. The pulses issuing from divider 62 on line 62*a*, together with the signal from flip-flop 40 on line 40*a* comprise the error signal $E_a$. The operation of a gate 14 in response to this error signal will be described below. The divider 62 is reset by the GR pulse after each successful correction.

The pulses on line 49*a*, which it will be remembered appear only when an ERP is received during a window period, in addition to being applied to divider 53 for counting down counter 42 are also applied to programmable divider 65. Divider 65, control circuit 66 and counter 67 permit the effect of non-uniform intervals between ERP's to be removed before further clock corrections are made. At every attempted measurement of clock error, the IRP and window are generated. At the start of each window a pulse is generated on line 67*a* which increments the counter 67. This counter is not reset by the general reset pulse on line 60*a* if the measurement attempt is unsuccessful. This is so since counter 67 is reset by a signal transition on line 47*b* which occurs when flip-flop 47 is reset and this flip-flop remains in the reset state if the measurement attempt is unsuccessful. As a result, when a successful measurement is finally made, counter 67 contains a number equal to the number of clock intervals which have occurred since the previous successful measurement in units of the period of the IRP pulses. By means of preset control logic circuit 66 the number in counter 67 is used to set the divisor of programmable divider 65.

This divisor, $T_w$, permits the divider to divide the pulses on line 49*a* by the measurement interval to produce a normalized number on line 65*a* which is the clock error per unit time. It should be noted that the divisor $T_w$ need not be equal to the interval number contained in counter 67 but may be a fraction thereof. If the measurement interval (period of the IRP pulses) is very short, divisor $T_w$ should preferably be only a small part of the number contained in counter 67.

The number of pulses on line 65*a* represents the frequency error of oscillator 10*a* in units of the number $T_w$ times the interval of the IRP pulses in seconds. Optionally the pulses on line 65*a* could be divided by an integer equal to the period of the IRP pulses (herein termed $T_c$) and used directly to increment or decrement an offset register 75 to fully correct any frequency error of the oscillator 10*a* as will be made obvious as the description proceeds. However, it is preferable that the number of pulses on line 65*a* be further divided by a fixed integer in divider 67 so that the output therefrom is only a part of the total correction. This allows averaging of random errors of noise effects. More important, it allows the error signal $E_b$ output from divider 67 to have a value as small as zero or plus or minus one. Without the additional division by divider 67 a step of one cannot be produced. Thus, the pulses on line 65*a* are divided in divider 67 by the product of $T_c$ and a constant integer $K_1$, where the reciprocal of $K_1$ represents a fraction of oscillator error corrected at each measurement. Typical values of $K_1$ are preferably between 2 and 10.

The pulses on line 67*a* increment or decrement an offset register 75 according to whether the signal level or sign on line 40*a* is high or low. In this particular embodiment if the local clock is faster (IRP earlier than ERP) then register 75 is decremented, to thus cause the oscillator frequency to be decreased slightly. Of course, if the local clock is slow with respect to the master clock register 75 is incremented.

It will be noted that divider 67 has applied thereto the signal on line 40*a* which is a measurement of the sign of the clock correction. If the sign is constant over several measurement intervals, and the pulses and the number of pulses on line 65*a* is less than the division ratio of divider 67 the divider accumulates its total until the carry output occurs to form a single output pulse on line 67*a*. If no carry occurs, then there are no output pulses. If the sign changes, divider 67 is decremented rather than incremented. The output carries on line 67*a* are produced whenever the full count is passed, in either direction. In other words, divider 67 is a simple binary divider which is incremented or decremented by pulses on line 65*a* in accordance with the sign on line 40*a*.

The divisor $K_1$ of divider 67 is optimally varied according to the needs of the environment in which this particular clock is used. It is desirable that during initial calibration of the clock from the master station that the factor $K_1$ should be very close to unity. After the local clock has been initially calibrated and during subsequent tracking of the local clock with the master clock, the factor $K_1$ can be larger. Thus, $K_1$ is optionally varied in accordance with a control signal on line 78 from an outside source which is not a part of the present invention.

Although dividers 65 and 67 produce an output signal which is proportional to the average error of the local oscillator with respect to the master oscillator, that is, in essence, the first time derivative of the clock error, finer control of the local oscillator can be provided by correcting the clock in accordance with the second time derivative of the oscillator error. This is accomplished by dividing the pulses on line 67*a* by divisor $K_2$ in divider 80. The signal on line 40*a* is also applied to divider 80, wherein it is used to perform the same function as in divider 67. Whenever an output is obtained from divider 80, on line 80*a*, it is used to increment or decrement a register 82 in accordance with the level of the signal on line 40*a*. Specifically, the pulses on line 80*a* decrement register 82 if the local clock is faster than the master clock and increment register 82 if the local clock is slower. The output from register 82 is the number contained therein, which represents the drift rate of oscillator 10*a*. This number in parallel format indicating whether the drift tends to make oscillator 10*a* faster or slower than the master oscillator appears on lines 82*a*. These signals are applied to a rate generator 84 which is simply a divider whose divisor is set by the signals on line 82*a* and which, in accordance with timing signals received from a source, not shown, on line 85, delivers a regular series of incrementing or decrementing pulses, depending on the sign of the number in register 82, to offset register 75 to thus provide a slow change to the number therein. A signal on line 82*b* indicates the sign of the number in register 82. Although the number in register 82 is not a time derivative in the strict mathematical sense, it is an approximation thereof. Approximations of this type are commonly used in control loops such as this.

The number in register 75 is applied in parallel format via lines 75*a* to on offset generator 77, which is a divide-by-M divider where M is set by the number on lines 75*a*. Timing pulses are applied from the output of oscillator 10*a* via line 77*b* to be divided in divider 77 to produce the error signal $E_f$ on line 77*a*. This error signal is comprised of a further pulse train, the pulses of which are applied to gate 14 to add pulses to or delete pulses from the output of oscillator 10*a* in accordance with the sign signal on line 40*a*.

It is preferable for hardware cost reasons that the output frequency from oscillator 10*a* be higher than normally required to operate clock divider 16*a* so that pulses are always deleted from the pulse train in response to the error signal $E_f$.

The number in offset register 75 is also entered into a non-volatile memory 79 via line 75*b* for use during subsequent initial start-up as will be explained below.

Figure 4:
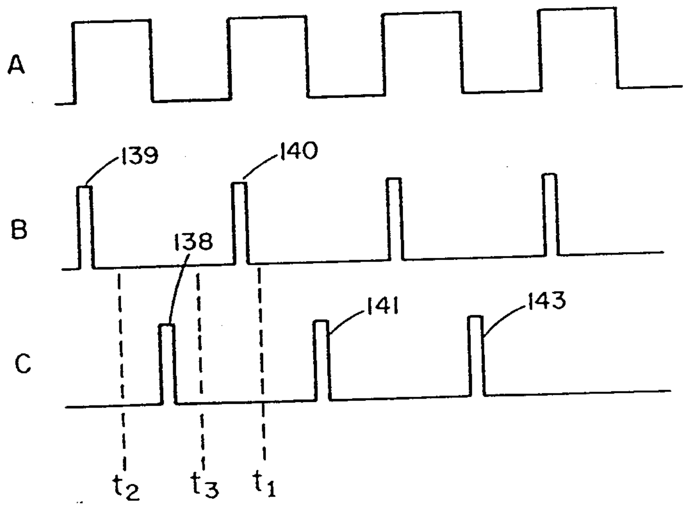
FIG. 4 illustrates the signal at various points in the block diagram of FIG. 3.
Figure 3:
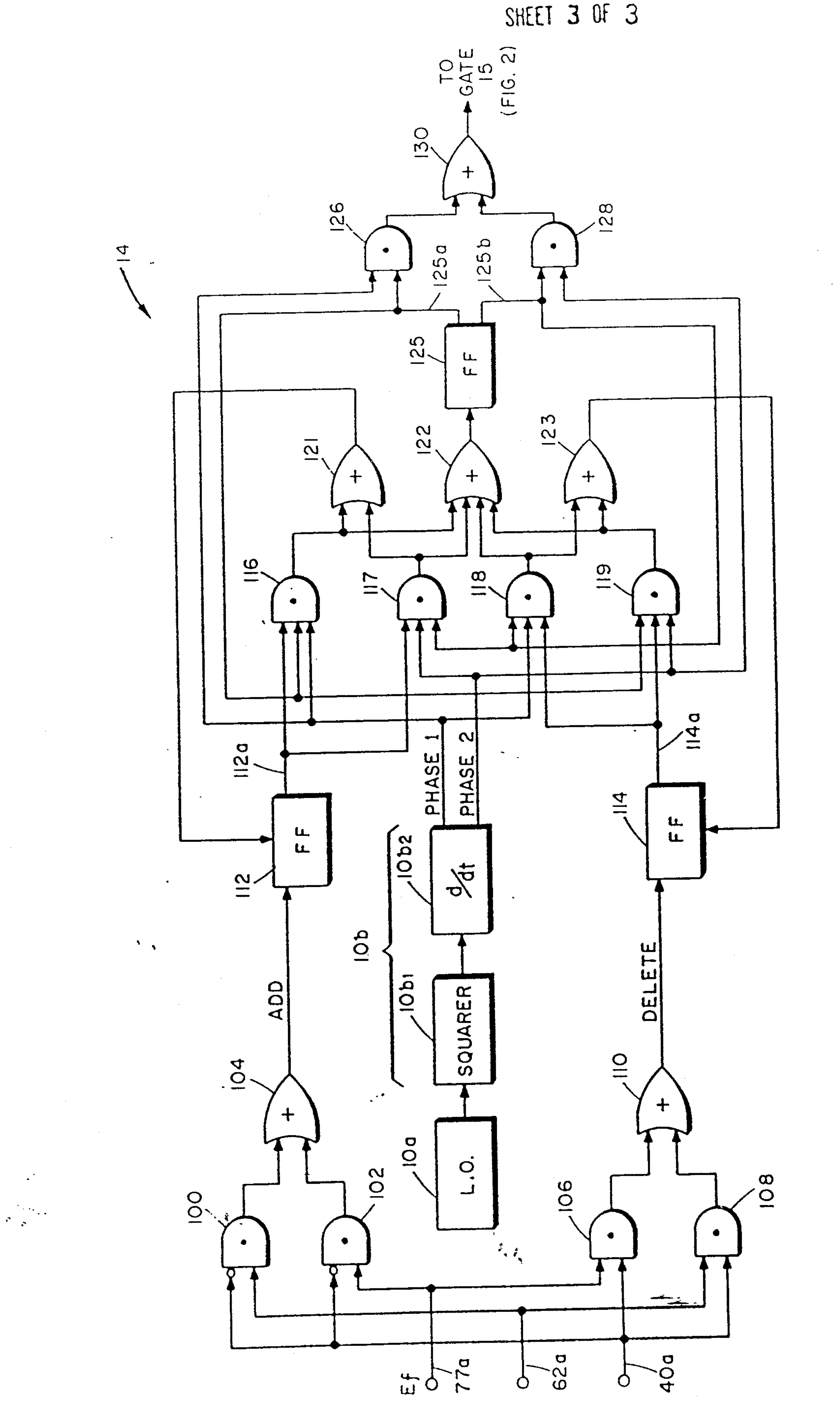
FIG. 3 is a block diagram which shows the means for adding or deleting pulses in greater detail.

Refer now to FIG. 3 which shows among other elements the pulse gate 14 in greater detail. Seen in this figure is the local oscillator 10*a* and a pulse generator 10*b* which is comprised of a squaring circuit 10*b*1 and a differentiator 10*b*2. The squarer circuit 10*b*1 simply squares the output from the local oscillator. Referring to FIG. 4 also, the output from the squarer is seen at line A therof. The differentiator 10*b*2 differentiates both the positive and negative excursions of the square wave and reverses one as illustrated at lines B and C in FIG. 4. Note that the pulses at line B which comprise phase 1 occur at the same pulse repetition frequency as the square wave as do the pulses on line C which comprise phase 2; however the pulses on line C are time displaced 180° with respect to the pulses on line B. In operation gate 14 is set to accept pulses from one of lines B or C to be passed on to gate 15 of FIG. 2. Assume that gate 14 is set to receive the pulses on line B and receives correction signal either $E_a$ or $E_f$ during the interval between pulses 139 and 140 to add a pulse. The gate will respond to this signal so that pulse 140 passes therethrough and immediately thereafter, for example at time $t_1$ the gate will shift into a second mode to accept the pulses on line C so that thereafter, and until another correction signal is received, the pulses on line C are passed through gate 14 and gate 15, for example pulses 141 and 143. Thus, an extra pulse will be passed through gate 14, in essence adding a pulse to the pulse train used to control the clock 16a of FIG. 2.

Assume again that gate 14 is set to pass the pulses on line B of FIG. 4, that during the interval between pulse 139 and 140 a signal is received to delete a pulse. Gate 14 will respond immediately after the next pulse on line C to change its mode of operation so as to thereafter accept the pulses on line C except that the next pulse will be clocked. Thus, in essence the gate operates in response to a delete pulse signal to drop one pulse from the pulse train passing therethrough.

Returning now to FIG. 3, the operation of the pulse gate will be described in detail. In normal operation of the pulse gate, that is when pulses are neither being added nor deleted from the pulse train passing therethrough and only the pulses of a single phase, for example phase 1, are passing therethrough, flip-flops 112 and 114 are in a reset state so that they generate no output signals and flip-flop 125 is either set or reset depending on which phase signals are passing through the gate. In this example it is assumed that flip-flop 125 is set so that it generates an output on line 125a which qualifies gate 126 so that the pulses of phase 1 may pass therethrough and through OR gate 130 to gate 15 of FIG. 2. Assume also that there is a relatively high signal on line 40a, which is also seen in FIG. 2, indicating, as has already been described, that the local clock is running faster than the master clock and hence pulses must be deleted from the pulse train to compensate therefor. Accordingly, AND gates 106 and 108 are qualified while AND gates 100 and 102 are inhibited. If one pulse of the correction signal on either line 62a or 77a is now received in the time interval between pulses 139 and 138 of FIG. 4, for example the time $t_2$, it will pass through gate 106 or 108 and gate 110 to set flip-flop 114 so that it generates an output on line 114a. Line 114a comprises one input to AND gates 118 and 119 while output line 125a of flip-flop 125 comprises a second input to gate 119 and phase 2 comprises the third input to the gate. Upon occurrence of the next phase 2 pulse, pulse 138, it will pass through gate 119 and OR gate 122 so that flip-flop 125 is toggled to thus close gate 126 and to apply a qualifying input at line 125b to AND gate 128. However, since flip-flop 125 is keyed by the trailing edge of pulses applied thereto, gate 128 will not open to allow the phase 2 pulses to pass through until after pulse 138. The next pulse to pass through gate 128 will be pulse 141, thus deleting a pulse from the pulse train. Again, assuming phase 1 pulses are passing through gate 126, if while there is a signal on line 40a a pulse appears at either line 62a or 77a between the pulses 139 and 140 but after pulse 138, for example at time $t_3$, flip-flop 114 will again be set to generate an output at line 114a to thus qualify gate 119. The next phase 1 pulse, which will be pulse 140, will, as usual, in this case pass through AND gate 126. However, the next phase 2 pulse, pulse 141, will pass through gate 119 and gate 122 to toggle flip-flop 125 to thus close gate 126 and qualify gate 128. As before, since flip-flop 125 keys on the trailing edge of pulses applied thereto, pulse 141 will not pass through gate 128 before it is qualified. However, subsequent phase 2 pulses will pass therethrough, such as pulse 143. In essence, a pulse has been deleted from the pulse train.

When a pulse is to be added to the pulse train the pulse in the correction signal can arrive any time between two pulses of the phase passing through the gate. For example, if the phase 1 signal is being passed through the gate where the phase 1 signal is represented by line B of FIG. 4 and the correction pulse is received between pulses 139 and 140 flip-flop 112 will be set to generate an output on line 112a. AND gate 116 will then receive inputs from line 112a and line 125a so that the next phase 1 pulse, pulse 140, will pass through gate 126 and will additionally pass through gate 116 and OR gate 122 to toggle flip-flop 125. Again, since flip-flop 125 keys on the trailing edge of pulses applied thereto gate 126 will remain open long enough to allow the phase 1 pulse to pass therethrough and then that gate will close and gate 128 will be qualified to pass subsequent pulses from phase 2. Thus, the next pulse through gate 14 will be pulse 141, thus adding a pulse to the pulse train. Further operation of the gate 14 should now be obvious.

In summary, gate 14 operates to add a pulse to the pulse train for each correction pulse applied thereto when the signal on line 40a is low. Immediately after the pulse is added gate 121 operates to reset flip-flop 112. Gate 14 responds to a correction pulse when the signal on line 40a is high to delete a pulse from the pulse train and operates through gate 123 to reset flip-flop 114 after the pulse is deleted.

In a unit actually built and tested a two-phase scheme, as described here, was used. It should be obvious, however, that an N-phase scheme can be used where pulse generator 10b generates an N-phase output and gate 14 is constructed to advance the signal passing therethrough from pulse generator 10b by one phase step for each add correction pulse and to retard the signal passing therethrough by one phase step for each delete correction pulse. The means for constructing an N-phase pulse generator and an add/delete gate to operate in this manner should be obvious to one skilled in the art.

At the beginning of this discussion it was mentioned that gate 15 of FIG. 2 is open during normal operation of this unit. Before start-up, gate 15 is closed. The unit may now be started up in any one of a number of ways. For example, when the power is turned on a pulse may be generated by pulse generator 90 which passes through OR gate 94. In addition the unit may be started up manually, such as by manual pulse control 92 which generates a pulse which passes through OR gate 94. In any event, the pulse from gate 94 dumps the contents of memory 79 into offset register 75 via line 79a and, in addition, triggers search circuit 96 to generate an output 96a to thus qualify gate 15 so that pulses from gate 14 can pass therethrough to start clock divider 16a. Gate 15 remains open until clock divider 16a generates the IRP which is applied to search circuit 96 which thereupon extinguishes the signal at 96a. All timing thus stops at the zero position. Gate 15 is held closed until the first ERP arrives, this ERP being applied to search circuit 96 so that that circuit once again generates an output at line 96*a* to open gate 15. Thereafter, the unit operates normally with gate 15 held open.

Other alterations and modifications of the embodiments herein will become apparent to one skilled in the art. Accordingly, the invention is to be limited only by the true scope and spirit of the appended claims.

The invention claimed is:

1. In a time ordered communications system including a master station having a master clock and at least one remote station which includes a local clock comprised of a binary divider for generating local timing signals used in operating said remote station in said communications system, and wherein said local clock is driven by a local frequency, and wherein said master station disseminates absolute time by broadcasting a synchronization signal via a radio link to said remote station in response to which said remote station generates an external reference pulse (ERP) a predetermined time after receiving said synchronization signal and additionally generates an internal reference pulse (IRP) at a predetermined local clock time, the system being so structured that the time deviation of said ERP with respect to said IRP being a measure of the absolute error of the local clock time with respect to master clock time and said master station transmits a synchronization signal for only a small percentage of IRP's, means for maintaining the local clock synchronized with said master clock comprising:

a source of a first train of pulses;

means responsive to correction signals comprised of correction pulses and a sign signal for adding or deleting a pulse in said first train for each of said correction pulses, the resultant pulses comprising said local signal;

a source of clock pulses;

means for generating a time window about said IRP;

counter means for accumulating a first number proportional to the number of said clock pulses occurring between said ERP and IRP when said ERP occurs in said time window;

means for generating said sign signal in response to one of said ERP and IRP occurring first;

means for accumulating a second number correlated to the number of consecutive time windows generated since the last ERP occured in one of the time windows;

means for dividing said first number by at least said second number to generate a further pulse train, the number of pulses in said further pulse train being proportional to the average time error of said local clock with respect to said master clock;

means responsive to said first number for generating a first of said correction signals; and, means responsive to said further pulse train for generating a second of said correction signals.

2. The means for maintaining a local clock synchronized with a master clock as recited in claim 1 with additionally:

a first pulse divider for dividing said further pulse train by at least a constant, said means for generating a second of said correction signals being additionally responsive to the divided further pulse train.

3. The means of claim 2 wherein said means for generating a second of said correction signals comprises:

an offset register for accumulating pulses from said further pulse train and the divided further pulse train in a direction determined by said sign signal;

a second pulse divider having a variable divisor set in accordance with the number of pulses instantaneously contained in said offset register, said second pulse divider dividing said first train of pulses to generate said second of said correction signals.

* * * * *